J. A. WALLACE.
TAIL HOLDER.
APPLICATION FILED APR. 20, 1911.
1,011,292.
Patented Dec. 12, 1911.
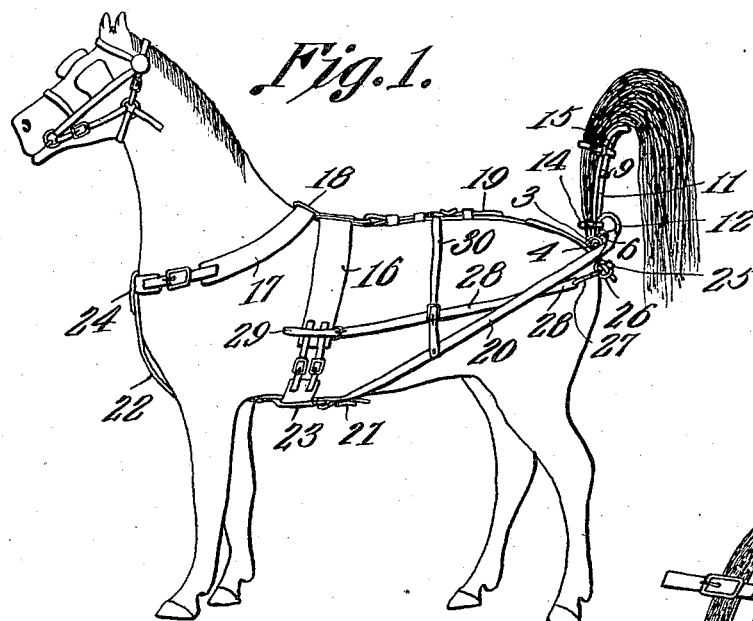
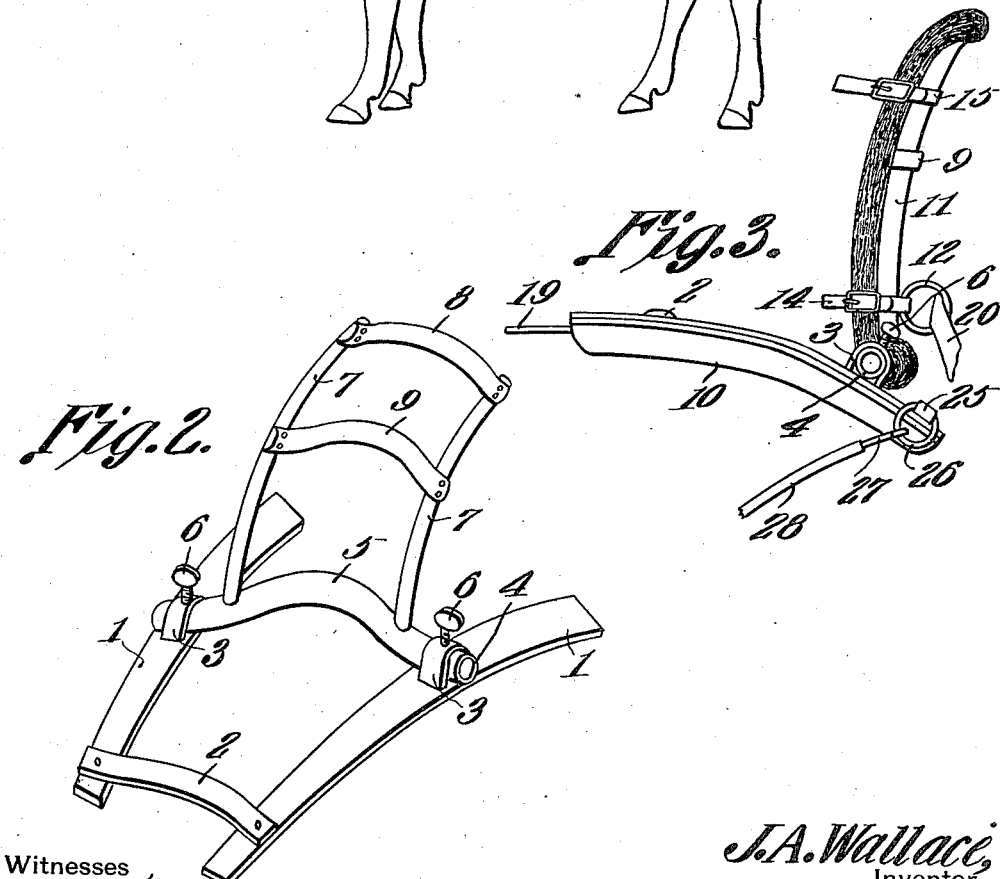
Witnesses
J. A. Wallace,
Inventor
by C. A. Snow & Co.
Attorneys

UNITED STATES PATENT OFFICE.

JAMES A. WALLACE, OF BOWLING GREEN, KENTUCKY.

TAIL-HOLDER.

1,011,292.   Specification of Letters Patent.   Patented Dec. 12, 1911.

Application filed April 20, 1911. Serial No. 622,348.

*To all whom it may concern:*

Be it known that I, JAMES A. WALLACE, a citizen of the United States, residing at Bowling Green, in the county of Warren and State of Kentucky, have invented a new and useful Tail-Holder, of which the following is a specification.

The device forming the subject matter of this application, includes a crupper, and a harness for maintaining the crupper in position, the crupper, in its turn, comprising a supporting structure, a movable tail-holder, and means for maintaining the tail-holder in adjusted positions, whereby the tail of the animal may be trained to stand at any desired curve.

The objects of the invention are, to provide a crupper having a movable tail-holder of novel and improved form, to provide means for maintaining the tail-holder in adjusted positions, and to provide means for holding the crupper upon the horse.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings,—Figure 1 shows the invention in side elevation, applied to a horse; Fig. 2 is a perspective of the frame of the crupper; and Fig. 3 is a side elevation of the crupper, the frame shown in Fig. 2 being padded, and certain auxiliary elements being appended to the crupper.

The crupper proper is shown most clearly in Figs. 2 and 3 of the drawings, the frame of the crupper appearing in Fig. 2, and the completed crupper, ready for mounting in place, being shown in Fig. 3. The crupper comprises a support, and a movable tail-holder pivotally connected with the support. The support preferably comprises a pair of bars 1, diverging toward their rear ends. These bars 1 are curved, so as to conform properly to the rump of the horse. Adjacent their forward ends, the bars 1 are connected by a cross bar 2. The bars 1 are equipped with bearings 3, in which is journaled for rotation a shaft 4, the shaft 4 constituting a part of the tail-holder. The shaft 4 is preferably although not necessarily, formed from a piece of pipe, the intermediate portion of the shaft 4 being rearwardly curved, as shown at 5. Relative movement between the shaft 4 and the bars 1 is prevented by means of set screws 6, or like clamping devices which, entering the bearings 3, engage with the shaft 4, adjacent the ends thereof.

The tail-holder, in addition to the shaft 4, comprises arms 7, projecting radially from the shaft 4, and secured therein in any desired manner. These arms 7 are given a rearward curve. The arms 7 are connected by an end bar 8, and by an intermediate bar 9, these bars 8 and 9 being dished slightly, to correspond with the curvature 5 of the shaft 4.

As denoted by the numeral 10 in Fig. 3, the supporting structure, comprising the bars 1 and 2, may be padded in any desired manner, and to any desired extent, while the tail-holder, comprising the elements 4, 7, 8 and 9, is padded as shown at 11. This padding 11, conforming to the curvature of the members 8, 9 and 5, and to the rearward curvature of the arms 7, serves to fashion a trough-shaped structure, rearwardly curved, and adapted to receive the tail of the animal. No specific description of the padding denoted by the numerals 10 and 11, need be entered into, since these details will be worked out by the saddler, to suit his own convenience.

Secured to the padding 11 of the tail-holder, at a point adjacent the pivotal mounting of the tail-holder, are rings 12, through which passes a strap 14, a similar strap 15 being secured to the padding 11 of the tail-holder, adjacent the upper, free end of the holder. When the tail of the animal is disposed in the holder, the straps 14 and 15 will be buckled across the tail, to hold the tail in place upon the holder.

The invention further includes a surcingle 16, and a neck-band 17, the upper portions of the surcingle and the neck-band being connected, as shown at 18. An adjustable back strap 19 connects the surcingle 16 with the ends of the bars 1 of the crupper.

The invention further includes a flank strap 20, the intermediate portion of which is extended through the rings 12 of the tail-holder, the ends of the strap 20 being carried downwardly, and diagonally, into adjustable union, as shown at 21, with the rear end of the martingale 22, the same being slidably connected with the surcingle 16, as shown at 23, the upper end of the martingale 22 being connected, as shown at 24, with the neck-band 17.

Mounted for swiveled movement upon the rear ends of the bars 1 of the crupper, are connections 25, carrying rings 26, adapted to be engaged by snaps 27 or the like, upon one end of each of a pair of side straps 28, the forward ends of the side straps 28 being adjustably connected, as shown at 29, with the surcingle 16, at any desired points. Preferably, the connection 29 is located upon the lower third of the surcingle. Slidable through the back strap 19, is an adjustable supporting strap 30, the lower ends of which are connected with the flank straps 20.

In practical operation, the supporting harness and the crupper are applied to the animal, the tail being held upon the tail-holder, and the tail-holder being tilted to the required angle, and there held, by the engagement between the set screws 6 and the shaft 4. The tail of the animal may thus be maintained at any desired angle, to assume a graceful curve, depending on the angle in which the tail-support is disposed. After the tail has been held, as shown in Fig. 1, for a requisite length of time, the structure may be removed, whereupon the tail will thereafter maintain a graceful and easy curve.

In so far as the showing of Fig. 1 is concerned, the parts of the device in Fig. 1 have been positioned so as to show the device as clearly as possible, and not to show of necessity, the angle at which the tail of the animal is to be held, it being understood that this latter feature, is a mere manner of adjustment.

Throughout this application, the word "strap" has been used in defining certain parts of the structure. It is understood that the word "strap," has been used to indicate a flexible element of any desired form, and fashioned from any desired material.

Having thus described the invention, what is claimed is:—

1. A device of the class described comprising a supporting structure; bearings thereon; a shaft journaled in the bearings; a tail-holding frame secured to the shaft; and means for holding the shaft against rotation.

2. A device of the class described comprising a supporting structure; bearings thereon; a shaft journaled in the bearings; a tail-supporting frame projecting radially from the shaft; and clamping devices in the bearings adapted to engage the shaft.

3. A device of the class described comprising a supporting structure, curved from end to end so as to conform to the curvature of the rump of a horse; a shaft journaled upon the supporting structure; rearwardly curved arms carried by the shaft; and bars connecting the arms, the bars and the shaft being curved, between the arms, to form a trough-shaped structure, adapted to receive the tail; and means for holding the shaft in adjusted positions.

4. A device of the class described comprising a surcingle; a neck-band united with the surcingle; a martingale connecting the neck-band with the surcingle; a crupper involving a supporting structure, an adjustable tail-holder, and means for maintaining the tail-holder in adjusted positions; a back-strap connecting the crupper with the surcingle; a flank strap connecting the crupper with the martingale; a single strap connecting the crupper with the surcingle; and a supporting strap connecting the back strap with the flank strap.

In testimony that I claim the foregoing as my own, I have hereto affixed my signature in the presence of two witnesses.

JAMES A. WALLACE.

Witnesses:
O. F. WHITE,
JOSEPH ROEMER.

---

Copies of this patent may be obtained for five cents each, by addressing the "Commissioner of Patents, Washington, D. C."